United States Patent
Lee et al.

(10) Patent No.: US 9,623,625 B2
(45) Date of Patent: Apr. 18, 2017

(54) GLASS SUBSTRATE PROTECTIVE PAD AND GLASS SUBSTRATE PACKING CONTAINER

(71) Applicant: Samsung Corning Precision Materials Co., Ltd., Gyeongsangbuk-do (KR)

(72) Inventors: BumRo Lee, ChungCheongNam-Do (KR); Seok-Woong Kim, ChungCheongNam-Do (KR); Sangku Moon, ChungCheongNam-Do (KR); Kyu-Hwan Lee, ChungCheongNam-Do (KR)

(73) Assignee: Corning Precision Materials Co., Ltd. (KR)

( * ) Notice: Subject to any disclaimer, the term of this patent is extended or adjusted under 35 U.S.C. 154(b) by 378 days.

(21) Appl. No.: 14/250,745

(22) Filed: Apr. 11, 2014

(65) Prior Publication Data

US 2014/0308467 A1 Oct. 16, 2014

(30) Foreign Application Priority Data

Apr. 15, 2013 (KR) .................. 10-2013-0040952

(51) Int. Cl.

| | | |
|---|---|---|
| *B65D 81/127* | (2006.01) | |
| *B32B 5/18* | (2006.01) | |
| *B65D 81/02* | (2006.01) | |
| *B65D 81/107* | (2006.01) | |
| *B32B 3/26* | (2006.01) | |
| *B32B 3/30* | (2006.01) | |

(Continued)

(52) U.S. Cl.

CPC .............. *B32B 5/18* (2013.01); *B32B 3/266* (2013.01); *B32B 3/30* (2013.01); *B32B 7/02* (2013.01); *B32B 27/065* (2013.01); *B65D 81/02* (2013.01); *B65D 81/022* (2013.01); *B65D 81/107* (2013.01); *B65D 81/127* (2013.01); *B32B 2266/025* (2013.01); *B32B 2266/0221* (2013.01); *B32B 2571/00* (2013.01); *Y10T 428/1376* (2015.01); *Y10T 428/24331* (2015.01); *Y10T 428/24504* (2015.01); *Y10T 428/24983* (2015.01); *Y10T 428/249953* (2015.04); *Y10T 428/249981* (2015.04)

(58) Field of Classification Search

CPC ........ B32B 5/18; B65D 81/02; B65D 81/022; B65D 81/107; B65D 81/127; Y10T 428/1376

IPC ................. B65D 81/02,81/022, 81/107, 81/127

See application file for complete search history.

(56) References Cited

U.S. PATENT DOCUMENTS 3,616,029 A * 10/1971 Lerman ................... B29C 67/20
156/219
4,004,727 A * 1/1977 Rausing .................. B32B 27/00
229/137

(Continued)

*Primary Examiner* — Walter B Aughenbaugh
(74) *Attorney, Agent, or Firm* — Lerner, David, Littenberg, Krumholz & Mentlik, LLP

(57) ABSTRACT

A glass substrate protective pad which protects a glass substrate in close contact with the glass substrate. The glass substrate protective pad has multiple layers, the rear layer of the multiple layers which is to be in close contact with the glass substrate containing foamed polymer. A glass substrate packing container for packing a plurality of glass substrates loaded therein, in which the above-described glass substrate protective pad is in close contact with the front surface of the plurality of glass substrates.

11 Claims, 5 Drawing Sheets

(51) Int. Cl.
*B32B 7/02* (2006.01)
*B32B 27/06* (2006.01)

(56) References Cited

U.S. PATENT DOCUMENTS 4,405,681 A * 9/1983 McEvoy .................. A47C 7/18
          264/46.4
5,588,531 A * 12/1996 Yoshida ............... B65D 81/022
          206/454

* cited by examiner

GLASS SUBSTRATE PROTECTIVE PAD AND GLASS SUBSTRATE PACKING CONTAINER

CROSS REFERENCE TO RELATED APPLICATION

The present application claims priority from Korean Patent Application Number 10-2013-0040952 filed on Apr. 15, 2013, the entire contents of which are incorporated herein for all purposes by this reference.

BACKGROUND OF THE INVENTION

Field of the Invention

The present invention relates to a glass substrate protective pad and a glass substrate packing container, and more particularly, to a glass substrate protective pad and a glass substrate packing container which can significantly reduce the breakage rate of a glass substrate.

Description of Related Art

A packing container is used as a means for packing a plurality of glass substrates which are used for a display panel or the like. For instance, a glass substrate manufacturer packs a plurality of glass substrates that are manufactured in a packing container before delivering the glass substrates to a display panel manufacturer. The glass substrate packing container loads, for example, 180 to 240 glass substrates thereon in the state in which papers and/or films are respectively interposed between the glass substrates. Here, in order to protect the glass substrates loaded on the packing container, a glass substrate protective pad is in close contact with the front surface of a stack of the 180 to 240 glass substrates.

However, the glass substrate protective pad of the related art has the problem of a high breakage rate due to surface pressure/imprinting. In addition, as the size of glass substrates increases (for instance, a glass substrate packing container of the invention is used for packing glass substrates, the length or width of which exceeds 2 m), the weight of the glass substrate protective pad increases. The workability of the packing or unpacking operation is not good, which is problematic. In addition, such degradation in the workability leads to an error of a worker during packing or unpacking, thereby resulting in damage at the bottom of the glass substrates. In addition, since the glass substrate protective pad does not have sufficient endurance, when it is used for a long time, the edge is especially worn, leading to damage in the glass substrates. Furthermore, in the glass substrate protective pad of the related art, a film, a paper or a glass substrate which is in face contact with the glass substrate protective pad may move along with the glass substrate protective pad due to surface pressure, thereby degrading workability, which is problematic.

The information disclosed in the Background of the Invention section is only for better understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide a glass substrate protective pad, the breakage rate of which can be significantly reduced. Also provided is a glass substrate packing container which can improve the workability of the operations of packing and unpacking glass substrates. Also provided is a glass substrate protective pad which can significantly reduce the breakage rate of a glass substrate.

In an aspect of the present invention, provided is a glass substrate protective pad which protects a glass substrate in close contact with the glass substrate. The glass substrate protective pad has multiple layers, the rear layer of the multiple layers which is to be in close contact with the glass substrate containing foamed polymer.

In another aspect of the present invention, provided is a glass substrate packing container for packing a plurality of glass substrates loaded therein, in which the above-described glass substrate protective pad is in close contact with the front surface of the plurality of glass substrates.

According to embodiments of the present invention, since the rear layer made of foamed polymer is employed, it is possible to significantly reduce the breakage rate of glass substrates which is caused by the protective film.

In addition, since the high-strength insert contained in the protective film prevents the protective film from being deformed, it is possible to prevent the protective film from being damaged. Consequently, it is possible to significantly reduce damage in glass substrates which would otherwise be caused by the protective pad.

Furthermore, since the weight of the protective pad is reduced, the workability can be increased. Consequently, it is possible to significantly reduce the breakage rate of glass substrates during working.

In addition, since the elastic member is disposed in a corner of the protective pad, it is possible to prevent the corner of the protective pad from being damaged. Consequently, it is possible to significantly reduce the breakage rate of glass substrates caused by the protective film.

Furthermore, since the concave-convex portions are formed on the rear surface, it is possible to prevent or reduce the movement of a film, a paper or a glass substrate along with the protective film.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
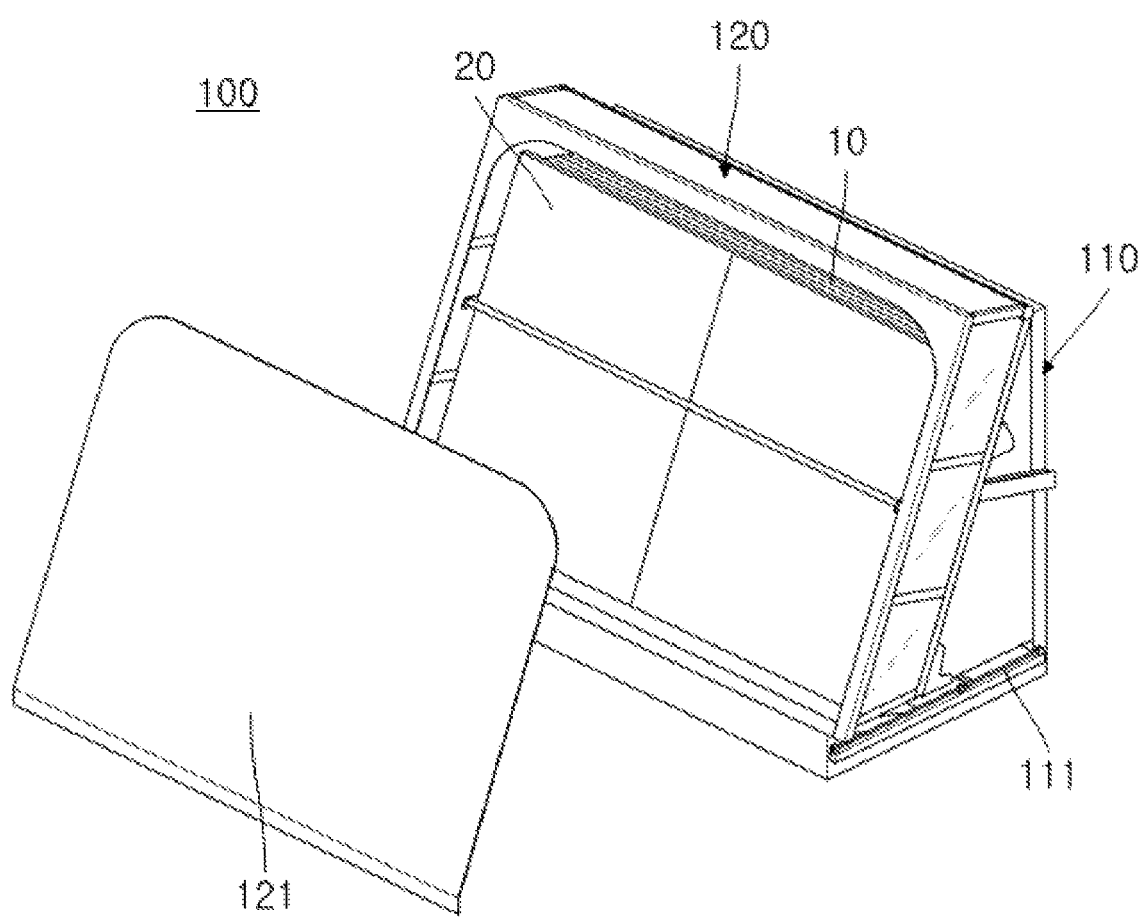
FIG. 1 is a perspective view showing a glass substrate packing container according to a first embodiment of the present invention.

Reference will now be made in detail to various embodiments of the present invention, examples of which are illustrated in the accompanying drawings and described below, so that a person having ordinary skill in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

FIG. 1 is a perspective view showing a glass substrate packing container according to a first embodiment of the present invention. As shown in FIG. 1, the glass substrate packing container 100 shown in FIG. 1 is used for packing a plurality of glass substrates 10 which are used for manufacturing a display panel, such as a liquid crystal display (LCD), a plasma display panel (PDP), an organic light-emitting diode (OLED) or a touch screen panel (TSP).

The glass substrate packing container 100 shown in FIG. 1 includes a loading part 110 and a cover part 120.

The loading part 110 is a component which forms a basic structure of the packing container 100, and supports the bottom and the rear surface of the glass substrates 10 such that the glass substrates 10 are loaded thereon. (In this specification, the direction from the front to the rear, the direction from bottom to top, and the direction from the left to the right are relative directions that are set for the sake of ease of explanation.)

The cover part 120 is a component which covers the glass substrates that are loaded on the loading part 110, thereby isolating the glass substrates from the outside. The cover part 120 is disposed on the loading part 110 such that it can slide along guide rails 111 of the loading part 110. The cover part 120 includes a front cover 121.

The plurality of glass substrates are packed in the glass substrate packing container 100 and loaded thereon. Here, the glass substrate protective film 20 is in close contact with the front surface of a stack of glass substrates, thereby protecting the glass substrates.

Figure 2:
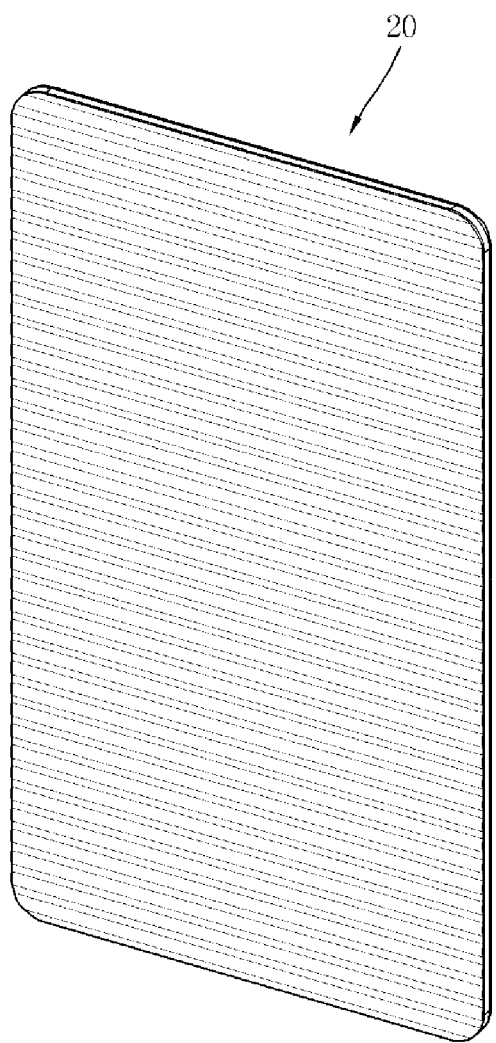
FIG. 2 is a perspective view showing a glass substrate protective pad according to a second embodiment of the present invention.
Figure 3:
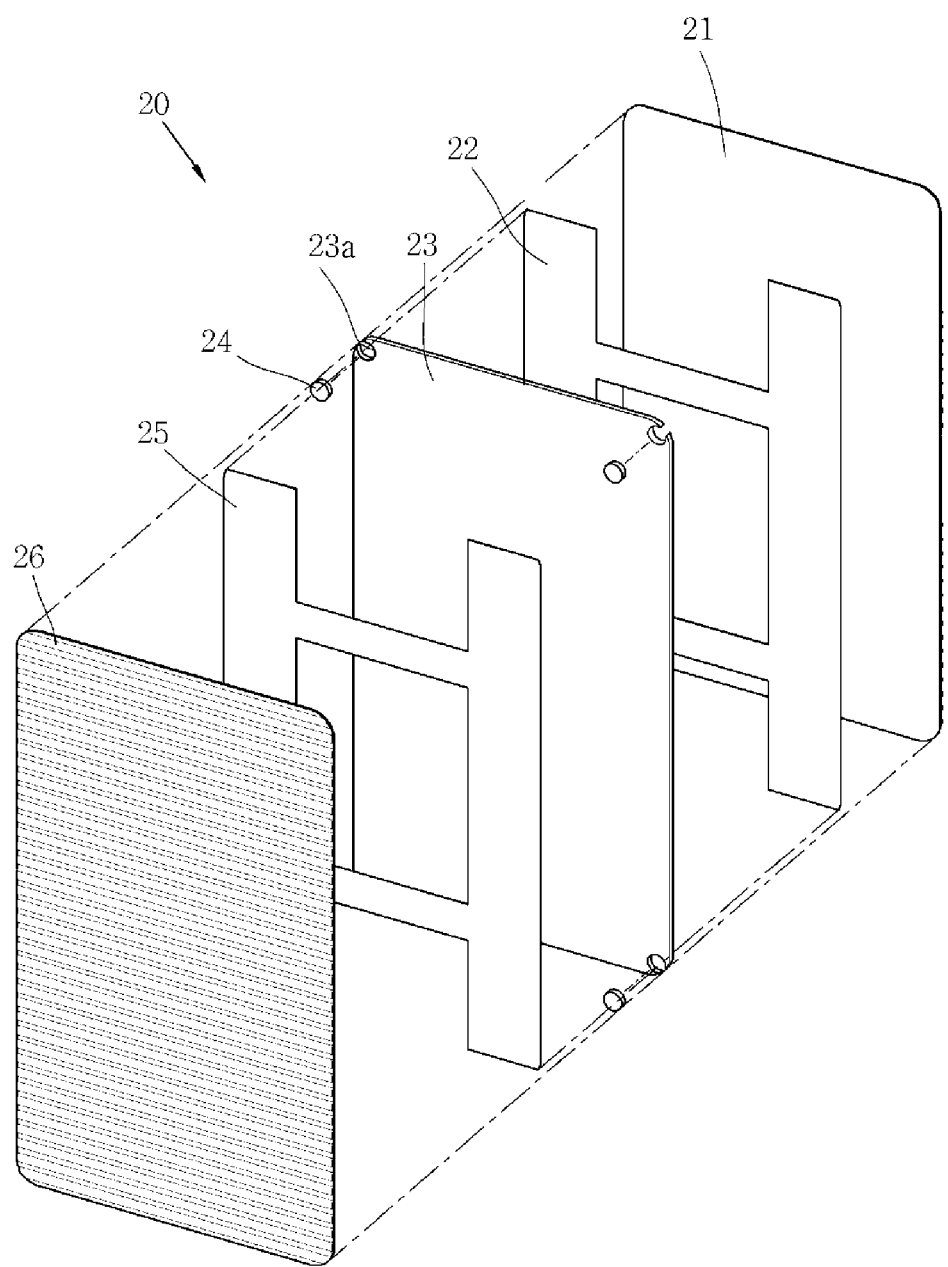
FIG. 3 is an exploded perspective view of the glass substrate protective pad shown in FIG. 2.
Figure 4:
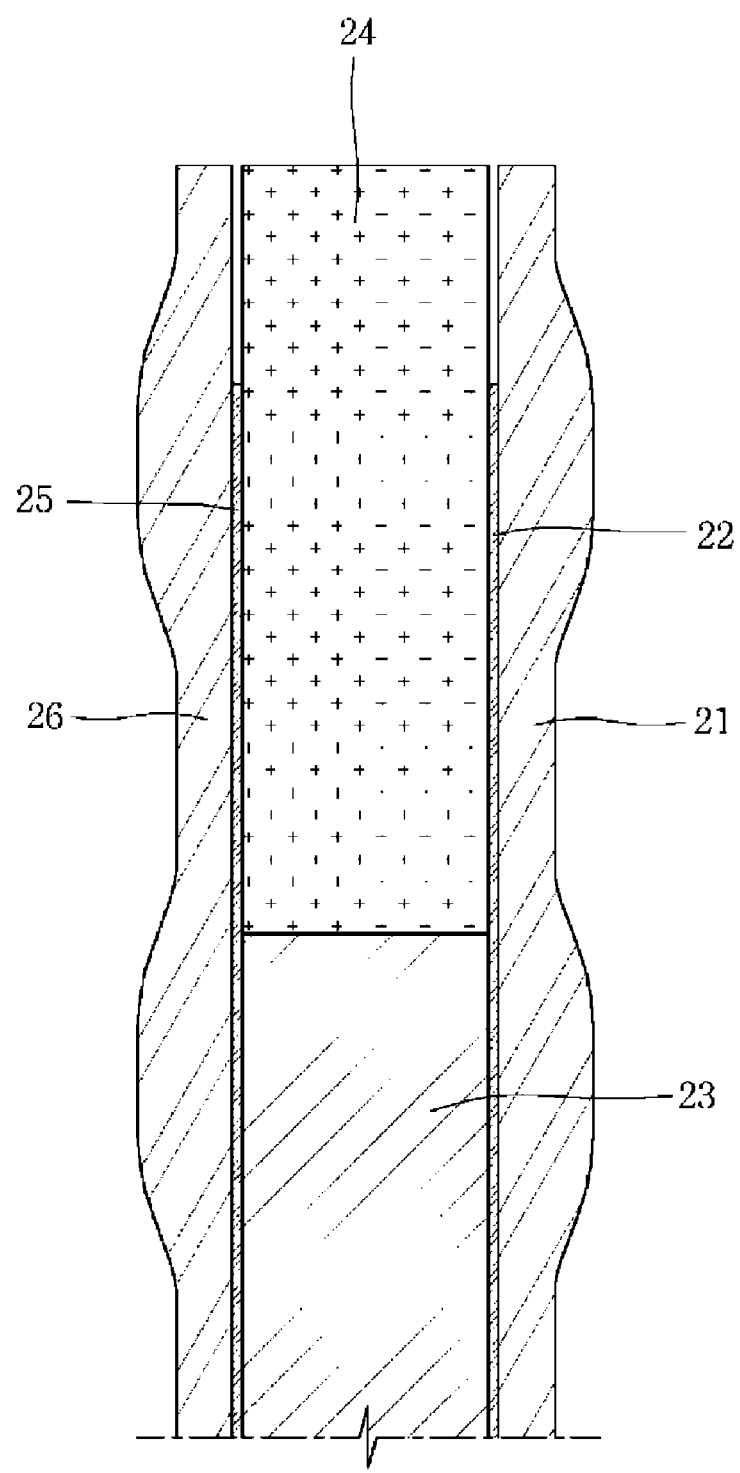
FIG. 4 is an enlarged side elevation view of a corner of the glass substrate protective pad shown in FIG. 2.
Figure 5:
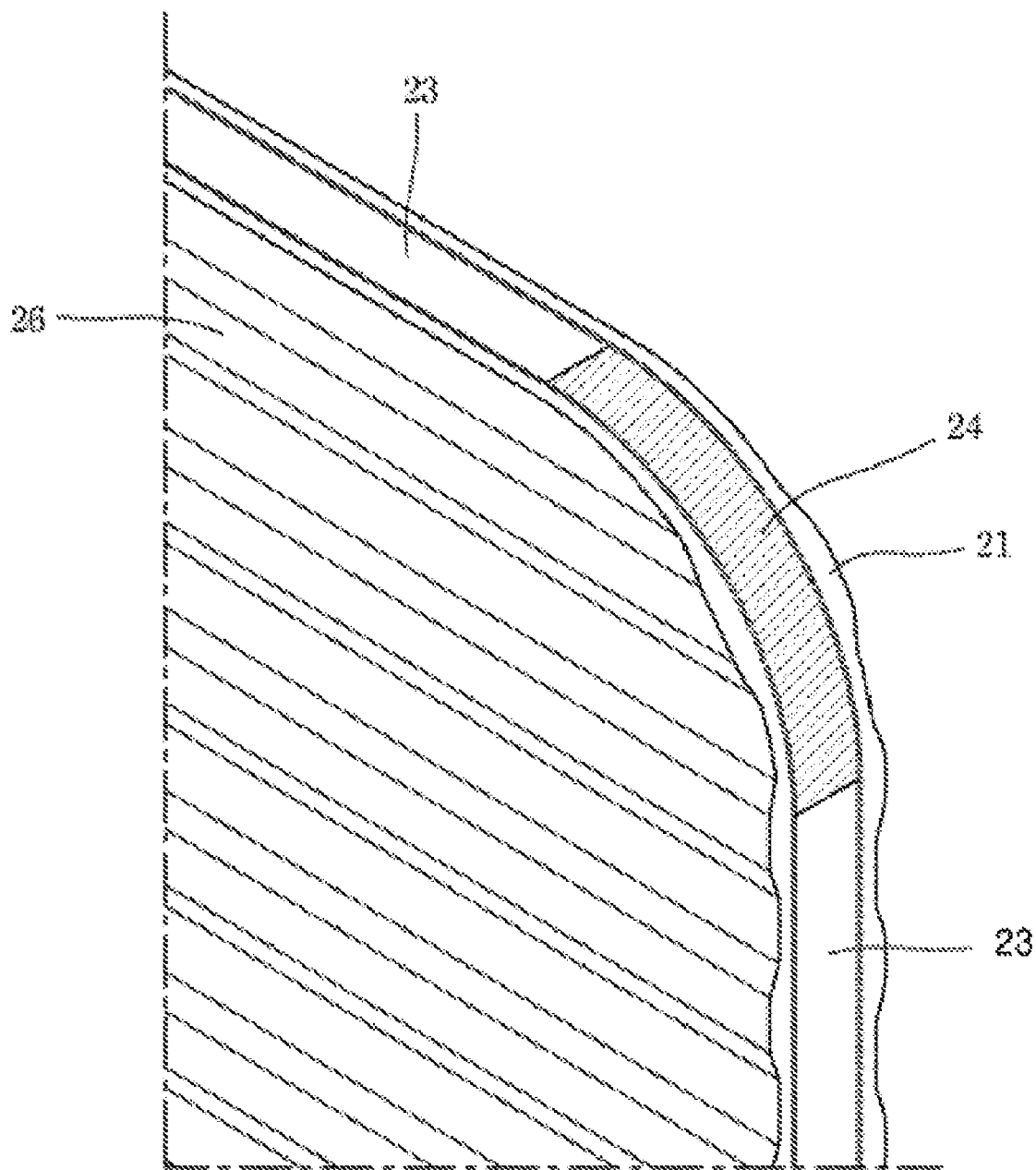
FIG. 5 is an enlarged perspective view of the corner of the glass substrate protective pad shown in FIG. 2.

FIG. 2 is a perspective view showing a glass substrate protective pad 20 according to a second embodiment of the present invention, FIG. 3 is an exploded perspective view of the glass substrate protective pad 20 shown in FIG. 2, FIG. 4 is an enlarged side elevation view of a corner of the glass substrate protective pad shown in FIG. 2, and FIG. 5 is an enlarged perspective view of the corner of the glass substrate protective pad shown in FIG. 2.

The rear surface of the glass substrate protective pad 20, as shown in FIG. 2, is in close contact with a stack of glass substrates. The glass substrate protective pad 20 acts to protect the stack of glass substrates. The glass substrate protective pad 20 is configured as multiple layers. According to this embodiment shown in FIG. 2, the glass substrate protective pad 20 includes a front layer 26, an insert 25, an inner layer 23, an elastic member 24, an insert 22 and a rear layer 21. However, it is apparent that the configuration of the glass substrate protective pad 20 of the present invention is not limited thereto but shall be defined by the appended claims. The glass substrate protective pad 20 shown in FIG. 2 is symmetrical in the direction from the front to the rear, in the direction from the left to the right and in the direction from top to bottom. It is therefore possible to use the glass substrate protective pad 20 without discriminating between the front and the rear, between the left and the right, or between top and bottom by overturning the glass substrate protective pad 20. However, in some embodiments, the configuration without a symmetrical structure may be possible. In this case, it will be discriminated between the front and the rear, between the left and the right, or between top and bottom. The front layer 26, the insert 25, the inner layer 23, the elastic member 24, the insert 22 and the rear layer 21 are sequentially arranged from the front.

The rear layer 21 is a layer that is in close contact with the glass substrate. The rear layer 21 contains foamed polymer. It is preferred that the rear layer 21 be made of at least one material selected from among, but not limited to, ethylene vinyl acetate (EVA), expanded polypropylene (EPP) and expanded polyethylene (EPE). The rear surface of the rear layer 21, i.e., the surface that is in close contact with the glass substrate, can have concave-convex portions. The concave-convex portions can have a variety of patterns. For instance, the concave-convex portions can have a stripe pattern or a dot pattern.

Each of the inserts 22 and 25 has a greater strength than the front layer 26, the elastic member 24, the inner layer 23 and the rear layer 21. Therefore, the inserts 22 and 25 prevent the glass substrate protective pad 20 from warping. The inserts 22 and 25 can be implemented as a light and high-strength material, which can be a variety of materials, such as a aluminum thin plate, a plastic thin plate, as long as they can maintain stiffness. The inserts 22 and 25 have a frame structure (skeleton structure). For instance, in addition to the ladder structure shown in FIG. 2, a variety of structures, such as a structure in which two lines of vertical bars intersect two lines of horizontal bars, is possible. Since the inserts have the frame structure, the weight can be decreased. It is preferred that the inserts 22 and 25 be symmetrical in the direction from top to bottom and in the direction from the left to the right. The upper and lower ends of the inserts 22 and 25 can be formed such that they are spaced apart from the upper and lower edges of the glass substrate protective pad 20 (see FIG. 4). Referring to FIG. 3, the upper and lower ends of the inserts 22 and 25 can be formed such that they are spaced apart from the upper and lower edges of the front layer 26, the inner layer 23 and the rear layer 21. Therefore, the height of the inserts 22 and 25, i.e. the length between the upper end and the lower end, can be smaller than the height of the front layer 26, the inner layer 23 and the rear layer 21, i.e. the length between the upper edge and the lower edge. According to the second embodiment, it is illustrated that the two inserts 22 and 25 are used, with one insert being interposed between the front layer 26 and the inner layer 23, and the other insert being interposed between the inner layer 23 and the rear layer 21. However, the present invention is not limited thereto.

It is preferred that the inner layer 23 be made of ethylene vinyl acetate (EVA). In addition, a variety of materials that are physically/chemically foamed can be used for the inner layer. The inner layer 23 has a through-hole 23a in the corner.

The elastic member 24 is disposed in the through-hole 23a of the inner layer 23. The elastic member 23 is made of a material that has greater elasticity (that is, a lower elastic modulus) than the rear layer 21, the insert 25, the inner layer 23, the insert 22 and the rear layer 21. The elastic member 24 can be implemented as, for example, a rubber material.

The front layer 26 contains foamed polymer. It is preferred that the front layer 26 be made of at least one material selected from among, but not limited to, ethylene vinyl acetate (EVA), expanded polypropylene (EPP) and expanded polyethylene (EPE). The front layer 26 has concave-convex portions which can have a variety of patterns. For instance, the concave-convex portions can have a stripe pattern or a dot pattern.

Table 1 represents the effect of the reduced thickness and weight of the glass substrate protective pad 20 shown in FIG. 2.

TABLE 1

|  | Comparative Ex. | Example | Remarks |
|---|---|---|---|
| Constitution | Polypropylene front layer (3 mm) EVA inner layer (15 mm) Polypropylene rear layer (3 mm) | EVA front layer (2.5 mm) Al insert (0.3 mm) EVA inner layer (10 mm) Al insert (0.3 mm) EVA rear layer (2.5 mm) | Unit cost 15% reduced |
| thickness | 21 mm | 15.6 mm | 24% reduced |
| weight | 12 kg | 8.5 kg | 30% reduced |

According to Example, workability is improved due to the reduced weight of the protective pad 20, and it is therefore possible to reduce the breakage rate of the glass substrate that is caused by mistakes of workers.

Table 2 represents results obtained by testing the protective pads of Example and Comparative Example in Table 1. Test was carried out by setting the test conditions as hostile as possible. Reproduction evaluation was carried out 50 times per item in the same fashion.

TABLE 2

| Evaluation item | Evaluation result | | Remarks |
|---|---|---|---|
|  | Comp. | Ex. |  |
| Occurrence of surface pressure | ▼ | ▲ | No surface pressure in Example |
| Fracture when glass is touched | ▼ | ▲ | No fracture in Example |
| Deformation when fastened to fixed bar | ⊙ | ⊙ | No deformation in Comparative Example/Example |
| Defect during delivery | ⊙ | ⊙ | No deformation/skid in Comparative Example/Example |
| Result from use of worker | ▼ | ▲ | Superior in Example |

The glass substrate protective pad of Comparative Example was damaged when the edge of the glass substrate was struck only once. In contrast, the glass substrate protective pad 20 of Example was not damaged after struck three times.

The foregoing descriptions of specific exemplary embodiments of the present invention have been presented with respect to the certain embodiments and drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. A glass substrate protective pad which protects a glass substrate in contact with the glass substrate, the glass substrate protective pad comprising: multiple layer, wherein a rear layer of the multiple layers which is to be in contact with the glass substrate contains foamed polymer and wherein the rear layer has concave-convex portions on a rear surface thereof which is to be in contact with the glass substrate; and an insert in front of the rear layer, wherein the insert has a frame structure.

2. The glass substrate protective pad of claim 1, wherein the concave-convex portions have a stripe pattern or a dot pattern.

3. The glass substrate protective pad of claim 1, wherein a strength of the insert is greater than a strength of the rear layer.

4. The glass substrate protective pad of claim 2, wherein the insert is vertically and laterally symmetrical.

5. The glass substrate protective pad of claim 1, wherein an upper end and a lower end of the insert are respectively spaced apart from an upper edge and a lower edge of the glass substrate protective pad.

6. The glass substrate protective pad of claim 1, further comprising a front layer in front of the rear layer, wherein the front layer contains foamed polymer.

7. The glass substrate protective pad of claim 1, further comprising:

a front layer in front of the rear layer; and wherein the insert is between the rear layer and the front layer, a strength of the insert being greater than a strength of the rear layer and than a strength of the front layer.

8. The glass substrate protective pad of claim 1, further comprising:

a front layer in front of the rear layer;

an inner layer between the rear layer and the front layer; and wherein the insert is between the rear layer and the inner layer and/or between the front layer and the inner layer, a strength of the insert being greater than a strength of the rear layer, than a strength of the inner layer, and than a strength of the front layer.

9. The glass substrate protective pad of claim 1, further comprising:

a front layer in front of the rear layer;

an inner layer between the rear layer and the front layer, the inner layer having a through-hole in a corner thereof; and an elastic member disposed in the through-hole of the inner layer, the elastic member being made of a material whose elasticity is greater than elasticity of the rear layer, than elasticity of the inner layer, and than elasticity of the rear layer.

10. The glass substrate protective pad of claim 1, wherein the foamed polymer comprises at least one selected from the group consisting of ethylene vinyl acetate (EVA), ethylene polypropylene (EPP) and expanded polyethylene (EPE).

11. A glass substrate packing container for packing a plurality of glass substrates loaded therein, wherein the glass substrate protective pad as claimed in claim 1 is in contact with a front surface of the plurality of glass substrates.

\* \* \* \* \*